United States Patent
Gervais et al.

(10) Patent No.: US 6,679,979 B2
(45) Date of Patent: Jan. 20, 2004

(54) AQUEOUS IONOMERIC GELS AND PRODUCTS AND METHODS RELATED THERETO

(75) Inventors: Wesley Gervais, Pitt Meadows (CA); Michael V. Lauritzen, Burnaby (CA); Kristi M. Zychowka, Vancouver (CA); Lawrence A. Vanderark, Surrey (CA); Kevin Michael Colbow, North Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 10/015,528

(22) Filed: Dec. 12, 2001

(65) Prior Publication Data

US 2003/0109631 A1 Jun. 12, 2003

(51) Int. Cl.$^7$ ................................. C25B 13/08
(52) U.S. Cl. ................. 204/252; 524/546; 524/547; 526/89
(58) Field of Search ................ 204/252; 524/546, 524/547; 526/89

(56) References Cited

U.S. PATENT DOCUMENTS

| | | | |
|---|---|---|---|
| 3,282,875 A | 11/1966 | Connolly et al. | 260/29.6 |
| 3,769,093 A | 10/1973 | Jones | 136/120 FC |
| 4,006,025 A | 2/1977 | Swank et al. | 96/129 |
| 4,330,654 A | 5/1982 | Ezzell et al. | 526/243 |
| 5,612,407 A * | 3/1997 | Southwick | 524/571 |
| 6,015,635 A | 1/2000 | Kawahara | 429/42 |
| 6,100,324 A * | 8/2000 | Choi et al. | 524/493 |
| 6,124,490 A * | 9/2000 | Gormley et al. | 556/425 |
| 2001/0005699 A1 * | 6/2001 | Morgan et al. | 473/376 |

FOREIGN PATENT DOCUMENTS

| | | |
|---|---|---|
| EP | 955 687 A2 | 11/1999 |
| EP | 0955687 * | 11/1999 |
| JP | 10-189003 | 7/1998 |

OTHER PUBLICATIONS

Machine Assisted Translation of JP 10–189003, Jul. 21, 1998.

Moore and Martin, "Chemical and Morphological Properties of Solution–Cast Perfluorosulfonate Ionomers," *Macromolecules 21*:1334–1339, 1988.

Zook and Leddy, "Density and Solubility of Nafion: Recast, Annealed, and Commercial Films," *Anal. Chem. 68*(21):3793–3796, 1996.

* cited by examiner

*Primary Examiner*—David W. Wu
*Assistant Examiner*—Henry S. Hu
(74) *Attorney, Agent, or Firm*—Seed IP Law Group PLLC

(57) ABSTRACT

An aqueous ionomer gel having a high viscosity, particularly a proton conducting ionomer, as well as to related products incorporating such gels. Such aqueous ionomer gels are suitable for suspending catalysts for formation of catalyst inks, which in turn are suitable for screen printing on a variety of surfaces. Representative surfaces are the electrode or membrane surfaces in an electrochemical fuel cell. Methods for making aqueous ionomer gels are also disclosed.

9 Claims, 3 Drawing Sheets

AQUEOUS IONOMERIC GELS AND PRODUCTS AND METHODS RELATED THERETO

BACKGROUND OF THE INVENTION

1. Field of the Invention

The present invention relates generally to aqueous ionomeric gels having a high viscosity, and particularly to gels wherein the ionomer is proton-conducting, as well as to related products incorporating such gels and methods for producing the same.

2. Description of the Related Art

In general, ion-exchange materials have been shown to be useful for a broad range of applications, and may generally be categorized as either anion- or cation-exchange materials. Such materials have been used in fields such as chromatography, catalysis, electrochemical processes, the creation of super acids and super bases, and for the separation, concentration and/or purification of various ionic species.

One important application of ion-exchange materials is their use as electrolytes in electrochemical fuel cells. In such applications, the electrolyte commonly conducts protons, and thus may be characterized as a cation-exchange material. Such cation-exchange materials may typically constitute an organic polymer having acidic functional groups attached thereto. The acidic functional groups, in turn, may comprise corresponding cations. In the context of fuel cell electrolytes, protons are the more common cations.

When the electrolyte is incorporated into a membrane, the ion-exchange material is often referred to as a proton-exchange membrane (or "PEM"), and fuel cells incorporating such a membrane are referred to as "PEM fuel cells." Cation-exchange materials may also be incorporated into PEM fuel cells in other forms, for example, as components in the catalyst layers or as electrode coatings.

In general terms, an electrochemical fuel cell functions by combining hydrogen, a suitable fuel and oxygen to produce electricity, heat and water. Fundamental components of PEM fuel cells include two electrodes—the anode and cathode—separated by the PEM. Each electrode is coated on one side with a thin layer of catalyst, with the PEM being "sandwiched" between the two electrodes and in contact with the catalyst layers. Alternatively, one or both sides of the PEM may be coated with a catalyst layer, and the catalyzed PEM is then sandwiched between a pair of porous and electrically conductive electrode substrates. The anode/PEM/cathode combination is referred to as a membrane electrode assembly or "MEA." A suitable fuel is one that dissociates into electrons and protons upon contact with the catalyst on the anode-side of the MEA. The protons migrate through the PEM, while the free electrons travel from the anode to the cathode, by way of an external circuit, producing a form of usable electric current. Upon contacting the catalyst on the cathode-side of the MEA, the protons that passed through the PEM, as well as oxygen and the electrons from the external circuit, combine to form water.

Desirable characteristics of a PEM include certain mechanical properties, high conductivity, resistance to oxidative and thermal degradation, and dimensional stability upon hydration and dehydration. It is also desirable to have a PEM with characteristics, including ease of handling, that allow it to be easily incorporated into a larger scale fabrication process. A variety of materials have been developed with these characteristics in mind, including perfluorinated sulfonic acid aliphatic polymers such as those described in U.S. Pat. Nos. 3,282,875 and 4,330,654. One example is a product sold by Dupont under the trademark Nafion®, which is a polytetrafluoroethylene-based ionomer containing sulfonic acid groups to provide proton conductivity.

Nafion® solutions have been shown to be generally suitable for blending with various forms of raw catalyst to create catalyst inks that can be applied to the surface of anode and/or cathode electrodes. For instance, nominal 10% aqueous Nafion® solution and nominal 20% alcoholic Nafion® solution are available and have been found to be suitable for use in a catalyst ink. However, such solutions and the inks prepared from them are typically characterized by relatively low viscosities.

The method by which the catalyst ink is to be applied to the electrode also requires specific application characteristics. Until recently, spraying has been used as the primary method of applying the catalyst layer. Advances in direct methanol fuel cell (DMFC) technology have lead to an increased demand for DMFC electrodes. It has been proposed that larger scale fabrication processes that screen-print the catalyst layer may prove more useful. A catalyst ink used to spray DMFC high-loaded anodes, made from a process that utilizes a suspension of 5% Nafion® in 2-propanol/water, comprising a solids content of approximately 12%, which include Pt/Ru black, 11% Nafion® and water has previously been utilized. Although this ink has been shown to be useful for preparing catalyst layers via spraying, it has not been suitable for screen-printing.

Screen-printing inks are generally prepared in larger batches and are used over a longer period of time. These conditions make it necessary that inks be resistant to separation or settling of the catalyst out of suspension. Furthermore, ink for screen-printing must have the properties of substantial viscosity (~1000 centipoise or greater@shear rates of about 10 second$^{-1}$), as well as both chemical and physical stability. For example, a continuous phase which is more viscous that the 5% Nafion® in 2-propanol/water previously used for spray application is necessary. Attempts to increase the ink viscosity, particularly utilizing aqueous Nafion® have been investigated. However, the previously attained viscosity of the aqueous suspension generally has not been adequate to suspend the catalyst. In addition, electrodes prepared with this ink have performed lower than the baseline spray techniques, particularly at high current densities (e.g. >200 mA/cm$^2$) where performance is dominated by mass transport effects.

Accordingly, there remains a general need in the art for improved aqueous ionomer gels and, more particularly, for aqueous ionomer gels suitable for screen-printing electrodes of electrochemical fuel cells. The present invention fulfills these needs, and provides further related advantages.

BRIEF SUMMARY OF THE INVENTION

In brief, an aqueous ionomer gel is disclosed that is substantially free of organic solvent(s), wherein the ionomer gel has an ionomer solids content ranging from about 4% to about 18% by weight of the ionomer gel, and a viscosity in excess of 5,000 centipoise at a shear rate of 10 seconds$^{-1}$. Suitable ionomers contain both a hydrophobic portion and an ionic portion and, in one embodiment, the ionomer is a graft copolymer having a hydrophobic backbone with pendent ionic portions grafted thereto. The ionomer may be a proton conducting ionomer, such as a perfluorosulfonate ionomer (i.e., Nafion®).

In a further embodiment, a catalyst ink is disclosed comprising an aqueous ionomer gel and a catalyst. Representative catalysts include, for example, noble metal catalysts including platinum. Such catalyst inks are suitable for coating a substrate surface in need of catalyst coatings, such as an electrode of an electrochemical fuel cell, particularly in the context of electrode screen-printing. Alternatively, such inks may be molded into various forms, such as a membrane or sheet, or may be coated onto a membrane, or may further comprise additional elements including a filler, binder and/or a pore forming material.

In other embodiments, methods are disclosed for making an aqueous ionomer gel. In one aspect, the method includes the steps of providing a solution comprising an ionomer, water and a nonaqueous solvent having a boiling point less than 100° C., wherein the nonaqueous solvent is miscible with water; and evaporating the nonaqueous solvent below ambient pressure to produce the aqueous ionomer gel. This method may further include the step of cooling the aqueous ionomer gel. The solution comprising the ionomer, water and the nonaqueous solvent may be formed by addition of the nonaqueous solvent to an aqueous ionomer solution.

In another aspect, the method includes the steps of rapidly cooling an aqueous ionomer solution to form a substantially frozen form of the aqueous ionomer solution, and thawing the substantially frozen form of the aqueous ionomer solution to produce the aqueous ionomer gel. After the step of thawing, the resulting aqueous ionomer gel may be diluted by addition of water.

The methods further include the step of adding a catalyst to the resulting aqueous ionomer solution to form the catalyst ink, as well as the application of such catalyst ink to a substrate surface with an optional annealing step. Products made according to the methods of this invention are also disclosed.

These and other aspects of this invention will be evident upon references to the following detailed description and attached drawings.

DETAILED DESCRIPTION OF PREFERRED EMBODIMENTS

Figure 1:
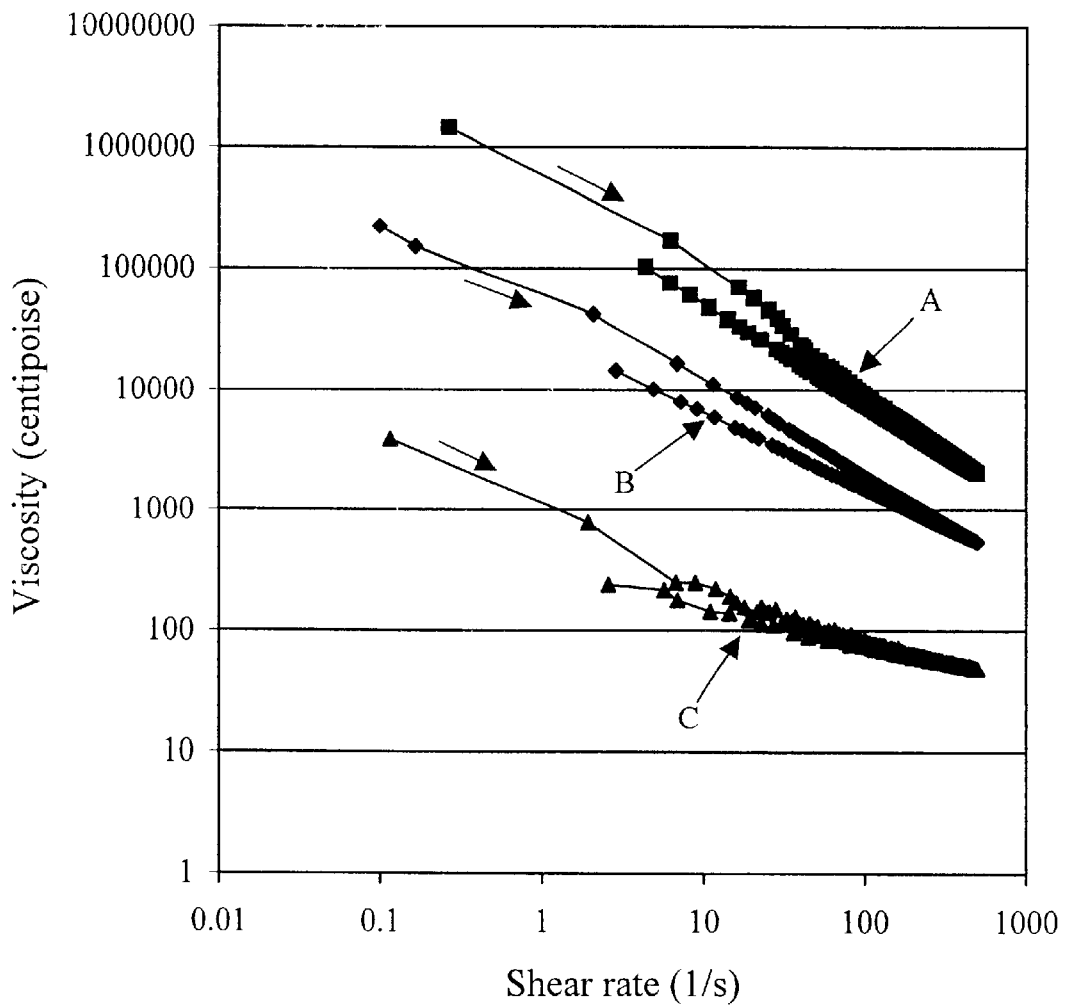
FIG. 1 shows viscosity versus shear rate plots for representative ionomer gels and for a comparative ionomer solution described in the Examples.

The present invention relates generally to aqueous ionomeric gels, as well as related products incorporating such gels and methods for producing the same. The present invention discloses aqueous ionomer gels substantially free of organic solvent, having a viscosity generally in excess of 5,000 centipoise at a shear rate of 10 seconds$^{-1}$, and having an ionomer solids content ranging from about 4 to about 18% by weight of the gel. The disclosed aqueous ionomer gels have a number of beneficial properties, including ease of handling and an increase ability to suspend catalyst as discussed in greater detail below.

As used herein, an "ionomer" is a copolymer of both non-ionic repeat units and a small amount (e.g., less than 15%) of ion-containing repeat units. Typically, such copolymers are graft copolymers, having a hydrophobic backbone with pendent ionic portions grafted thereto. However, in other embodiments, the copolymer can be random or block copolymers. In one embodiment, the ion-containing repeat units are acidic functional groups comprising corresponding cations, such as protons, and are referred to as a "cation-conducting ionomer." Representative ionomers in this context include, but are not limited to, perfluorosulfonate ionomers, such as Nafion® (Dupont), Flemion®, or BAM® ionomers.

"Substantially free of organic solvent" means that the aqueous ionomer gel contains, little, if any, organic solvent. Generally, this means that the aqueous ionomer gel contains less than 4% by volume of an organic solvent, and typically less than 2%.

The viscosity of the aqueous ionomer gel should be sufficient to suspend a noble metal catalyst for an extended period of time. As noted above, this viscosity is generally in excess of 5,000 centipoise at a shear rate of 10 seconds$^{-1}$, and typically in excess of 10,000 centipoise.

As noted above, the ionomer solids content of the aqueous ionomer gel ranges from about 4 to about 18% by weight of the gel. In other embodiments, the ionomer solids content of the gel ranges from about 6 to about 12%, and may be about 10%.

In another aspect of this invention, a catalyst ink is disclosed comprising the aqueous ionomer gel and a catalyst. Representative catalysts in this regard include, but are not limited to, noble metals such as platinum, and alloys, mixtures, and oxides thereof. The amount of catalyst present in such catalyst inks will vary depending upon the intended use. For example, in the context of a catalyst ink for application to an electrochemical fuel cell electrode, the catalyst generally ranges from about 4 to about 40% by weight of the catalyst ink, and often from about 20 to about 40%.

Catalyst inks may, in addition to the aqueous ionomer gel and catalyst, further comprise one or more of a filler (e.g., carbon), binder (e.g., Teflon) and/or pore forming material (e.g., suitable particulate that may be removed by dissolution after application). The amount of such additional agents will depend upon the intended application, and can be readily determined by one skilled in this field.

A wide variety of substrates may be coated with a catalyst ink of this invention, with typical application being to at least one surface of the substrate. For example, and again in the context of a catalyst ink for application to an electrochemical fuel cell electrode, the catalyst ink is coated on the surface of the electrode, such as by screen-printing. Before, during or after application, it may be advantageous to anneal the catalyst ink or ink-coated surface.

Although not intending to be limited by the following theory, it is believed that the aqueous ionomer gel, and more specifically the ionomer itself, is present in inverse micellular form. As mentioned above, the ionomer comprises both non-ionic and ionic portions. The non-ionic portions are hydrophobic in nature, while the ionic portions are hydrophilic. In an aqueous solution, such an ionomer will typically exist as a micelle with the hydrophobic inner core and having only the hydrophilic portions exposed to the water solvent. In contrast, it is believed that the aqueous ionomer gel of this invention is in the form of an inverse micelle—that is, with a hydrophilic inner core with entrapped water and having the hydrophobic portion exposed to the water solvent. Annealing is believed to cause the molecular chains in the aqueous ionomer gel to relax, thus allowing the hydrophilic (i.e., ionic) portion to better serve as an ion-conducting material.

In one embodiment of the present invention, the aqueous ionomer gel is made by an evaporation method. In this method, the aqueous ionomer gel having an ionomer solids content ranging from about 4% to about 18% by weight of the gel and a viscosity in excess of 5,000 centipoise at a shear rate of 10 seconds$^{-1}$ is made by providing a solution comprising an ionomer, water and a nonaqueous solvent having a boiling point less than 100° C. The nonaqueous solvent is miscible with water and includes (but is not limited to) alcohols and ketones. In a more particular embodiment, the nonaqueous solvent has a boiling point ranging from about 50° C. to less than 100° C. A representative alcohol includes methanol, while a representative ketone includes acetone. In one embodiment, the nonaqueous solvent is non-azeotrope forming with water, since this results in shorter processing times.

The nonaqueous solvent is evaporated from the solution of ionomer, water and the nonaqueous solvent. This evaporation is accomplished below ambient atmospheric pressure, such as by application of a vacuum. Generally, the evaporation is accomplished below 200 mbar absolute, and more typically below 70 mbar absolute. Further, such evaporation may be performed in the absence of applied heat or optionally with applied heat. The evaporation will proceed more quickly with applied heat but will require more control. By this technique, removal of the nonaqueous solvent or volatile solvent from the results in the thickening and gelation of the ionomer, yielding the aqueous ionomer gel. Following formation of the aqueous ionomer gel, the method may further include the step of cooling, particularly if heat is applied during the evaporation step. In addition, the method may further include the step of adding a catalyst to the resulting aqueous ionomer gel. Alternatively, the catalyst may be added to the solution of ionomer, water and the nonaqueous solvent prior to the evaporation step.

The solution of ionomer, water and the nonaqueous solvent may be provided by addition of the nonaqueous solvent to an aqueous solution of ionomer, or by addition of water to a nonaqueous solution of ionomer. Prior to the step of evaporating, the solution comprising the ionomer, water and the nonaqueous solvent may be heated to facilitate solvation of the ionomer. Such heating may occur at temperatures up to 40° C.

In another embodiment, the aqueous ionomer gel of this invention is made by a cooling method. In this method, an aqueous ionomer gel having an ionomer solids content ranging from about 4% to about 18% by weight of the gel and a viscosity in excess of 5,000 centipoise at a shear rate of 10 seconds$^{-1}$ is made by rapidly cooling an aqueous ionomer solution to a temperature below −5° C. to form a substantially frozen form of the aqueous ionomer solution, which is then thawed to yield the aqueous ionomer gel.

Following the thawing step, this method may further include the step of diluting the aqueous ionomer gel with water in order to achieve the desired viscosity. It has been found that this cooling method may yield aqueous ionomer gels having very high viscosities, such as viscosities in excess of 10,000 centipoise at a shear rate of 10 seconds$^{-1}$. Thus, dilution of the gel with water lowers the viscosity to achieve the desired viscosity of the aqueous ionomer gel.

After formation of the aqueous ionomer gel, this method may also include the further step of catalyst addition. Such catalyst addition typically occurs following formation of the aqueous ionomer gel, but may alternatively occur at a point prior to formation of the aqueous ionomer gel (such as prior to the freezing step).

As discussed above, both the evaporation and cooling methods result in formation of the aqueous ionomer gel, wherein the gel may be made into a catalyst ink by addition of a catalyst at a suitable point in the formation of the aqueous ionomer gel. Such catalyst inks may further comprise the addition of, but not limited to, a filler, binder and/or pore forming material. The resulting catalyst ink may then be used for a wide variety of application, including application to the surface of a substrate, such as the electrode of an electrochemical fuel cell, or to the surface of a membrane electrolyte. Alternatively, dye casting or similar techniques may be used to form the catalyst ink into a sheet or membrane. The product may be annealed following application to, or formation of, the desired product, for the reasons discussed above.

The following Examples are provided by way of illustration, and should not be interpreted as limitation of the present invention.

EXAMPLE 1

Preparation by Evaporation of Representative Aqueous Ionomer Gel

Three (3) kilograms of aqueous Nafion® gel were prepared in approximately 4 hours (i.e., 3–3½ hour evaporation time) by the following method. A commercially available solution of 10% aqueous Nafion® (product of DuPont) and acetone were combined to form a 3:2 ratio by volume of 10% aqueous Nafion® to acetone. In order to facilitate solvation and the extension of the Nafion® chains, the mixture was stirred and heated to about 40° C. This mixture was then rotary evaporated, at about a 100–200 mbar pressure, in the absence of applied heat until the acetone was entirely removed but before a significant amount of water was removed (at the point when the bubbling or foaming of the mixture subsided). Upon thickening (as evidenced by the solution coating the walls of the flask), the evaporated suspension was removed from the rotary evaporator and quenched in an ice bath. The resulting aqueous gel was still approximately 10% Nafion®.

The viscosity versus shear rate characteristics of the aqueous Nafion® ionomer gel and the commercially available aqueous Nafion® solution were determined using a Haake viscometer and appear in FIG. 1 as plots A and C respectively. Viscosity values were initially taken at increasing shear rates (as indicated by the arrows in FIG. 1) and then at decreasing shear rates. The hysteresis observed is indicative of the thixotropic nature of these solutions. As illustrated in FIG. 1, the viscosity of the aqueous gel (plot A) is more than two orders of magnitude greater than that of the commercially available solution (plot C).

EXAMPLE 2

Process for Nafion® Gelation via Solvent Exchange

Here, aqueous Nafion® gel was prepared by exchanging the alcohol in an alcoholic Nafion® solution with water. 200 g of 20% Nafion® alcoholic solution (which also contained 15–20% w/w water) was placed in a 2L flask. To this, 381 g of water was added and the flask was attached to a Model R121 Buechi Rotovapor. The flask was lowered into a water bath set to 30° C. and the rotator speed was set to about 50 rpm. The pressure in the flask was reduced and maintained at about 30–60 mbar (a sufficiently low pressure to remove solvent at a fast rate while minimizing boil-over). Evaporation continued until the alcohol was removed, leaving behind an aqueous gel containing ~9.3% solids and having a substantially greater viscosity than a conventional aqueous solution with similar solids content (e.g. than plot C in FIG. 1).

EXAMPLE 3

Preparation by Freezing of Representative Aqueous Ionomer Gel

This example illustrates the preparation of an aqueous ionomer gel by freezing an aqueous ionomer solution to form a substantially frozen form of the solution, followed by thawing the same. A commercially available 10% aqueous Nafion® solution was cooled in an ice bath at −5° C. while stirring. The solution did not freeze at this temperature, and the resulting material did not show significantly different properties from those of the initial solution. In particular, there was no significant gel formation, and no significant increase in viscosity. The above procedure was repeated, but the aqueous Nafion® solution was frozen at the intermediate temperatures of approximately −25° C. Freezing did occur. However, upon thawing, no homogenous substantially gel structure formed. Instead, the ionomer appeared to have precipitated, and two distinct phases were apparent.

The above process was again repeated, but with more aggressive cooling using a liquid nitrogen-acetone slurry having temperature in the range of −70° C. to −80° C. The measured cooling rate was about 6–8° C./minute and the aqueous Nafion® solution froze rapidly. After thawing at room temperature, the solution had formed a homogenous gel structure, having substantially increased viscosity. The viscosity versus shear rate characteristics of this 10% aqueous Nafion® ionomer gel were determined as in Example 1 and appear in FIG. 1 as plot B. As illustrated, the viscosity of this aqueous gel (plot B) is more than an order of magnitude greater than that of the commercially available solution (plot C).

EXAMPLE 4

Preparation of Catalyst Ink

A catalyst ink was then prepared by mixing Pt/Ru alloy black catalyst powder together with the aqueous Nafion® gel from Example 1 plus additional water. The mixture had approximately 30% solids and was found to be particularly suitable for screen printing. The mixture was homogeneous, had no catalyst particle granularity, and was stable for at least 24 hours under modest shearing.

EXAMPLE 5

Representative and Comparative Electrodes

Using the catalyst ink from Example 4, representative electrodes were prepared and used as anodes in laboratory direct methanol fuel cells (DMFCs). The anodes were made by spray coating or screen printing (as indicated below) the catalyst ink onto non-woven carbon fibre substrates. The cathodes in the DMFCs were conventionally prepared and employed platinum catalysts on similar substrates. The electrolytes in the DMFCs were Nafion® sheets. Performance data, in the form of voltage versus current density plots, were obtained for each cell. In this testing, the cells were supplied with excess reactants (0.4M methanol in water and air for the fuel and oxidant respectively) and were operated at 110° C. Additional DMFCs for comparison purposes were prepared and tested in a similar manner to the preceding cells, except that conventional anode catalyst inks were employed.

Figure 2:
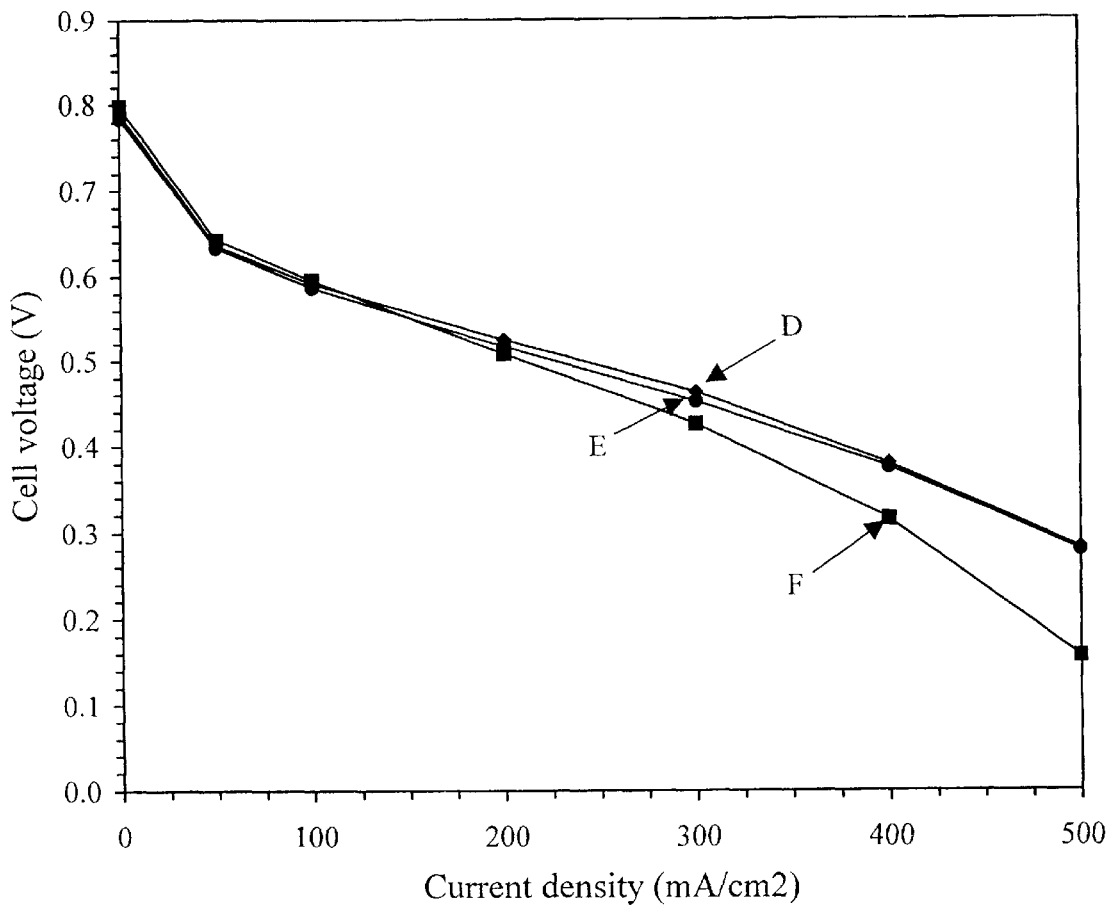
FIG. 2 compares the voltage versus current density plot of a fuel cell comprising an anode prepared using a sprayed aqueous Nafion® catalyst ink of the invention to comparative fuel cells.

FIG. 2 shows the voltage versus current density plots for various DMFCs whose anodes were prepared by spray coating catalyst inks onto the substrates. Plot D shows results for a cell made with the catalyst ink of Example 4. Plot F shows results for a cell made with a compositionally similar but conventional aqueous catalyst ink. Plot E shows results for a cell made with a conventional alcohol based catalyst ink, similar to the preceding except that the solvent in the ink was alcohol instead of water. The DMFC anode utilizing the aqueous Nafion® gel based anode ink (plot D), performed better than the anode prepared with the conventional aqueous Nafion® based anode ink (plot F), and performed equivalently to the anode prepared with the alcoholic Nafion® based ink.

Figure 3:
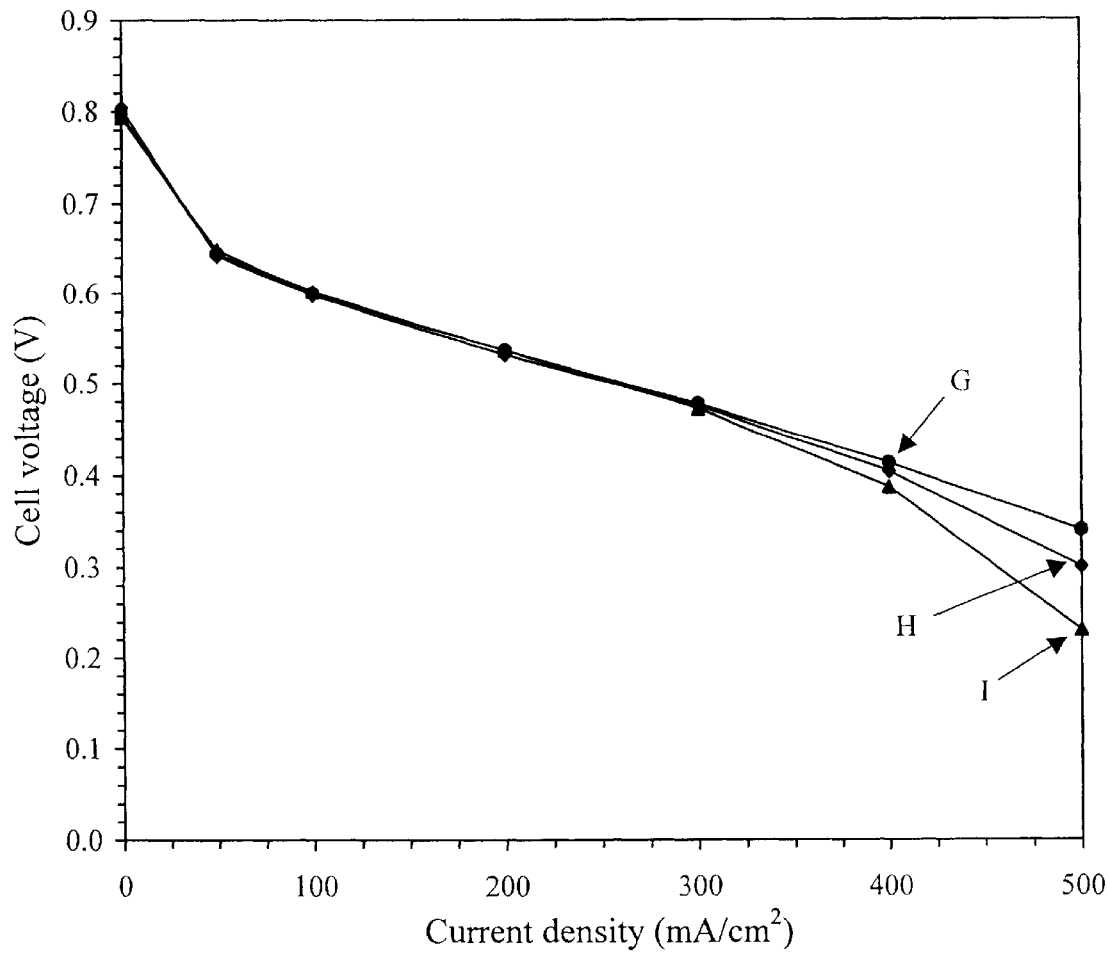
FIG. 3 compares the voltage versus current density plots of fuel cells comprising anodes prepared using a screen printed aqueous Nafion® catalyst ink of the invention (one anode with subsequent annealing and the other without) to that to a comparative fuel cell.

In FIG. 3, plots H and I show results for DMFCs comprising anodes in which the catalyst ink of Example 4 was screen printed successfully onto the substrates. The plot H anode was annealed afterwards by heating it on a hot plate at about 140° C. for 10 minutes. The plot I anode was not annealed. For comparison, plot G shows results for another comparative cell whose anode was spray coated with a conventional alcohol based catalyst ink (i.e. made similar to the cell of plot E in FIG. 2). The unannealed, screen printed DMCF anode utilizing the aqueous Nafion® gel based anode ink (plot I), performed noticeably worse than the anode prepared with the conventional alcoholic Nafion® based anode ink (plot G). However, as shown by plot H, annealing the anode improves cell performance significantly and almost to the level of plot G.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An aqueous ionomer gel with organic solvent contaminants at a concentration below 4% by volume, having an ionomer solids content ranging from about 4% to about 18% by weight of the gel and a viscosity in excess of 5,000 centipoise at a shear rate of 10 second$^{-1}$.

2. The gel of claim 1 wherein the ionomer is in the form of inverse micelles having the hydrophobic portion disposed outwardly and the ionic portion disposed inwardly.

3. The gel of claim 1 wherein the ionomer is a graft copolymer having a hydrophobic backbone and pendent ionic portions grafted thereto.

4. The gel of claim 1 wherein the ionomer is a proton conducting ionomer.

5. The gel of claim 4 wherein the proton conducting ionomer is a perfluorosulfonate ionomer.

6. The gel of claim 1 wherein the organic solvent contaminants are at a concentration below 2% by volume.

7. The gel of claim 1 wherein the ionomer solids content ranges from about 6 to about 12% by weight.

8. The gel of claim 1 wherein the ionomer solids content is about 10% by weight.

9. The gel of claim 1 wherein the viscosity is in excess of 10,000 centipoise at a shear rate of 10 second$^{-1}$.

* * * * *